United States Patent
Batterywala

(10) Patent No.: US 7,197,729 B2
(45) Date of Patent: Mar. 27, 2007

(54) METHOD AND APPARATUS FOR COMPUTING EQUIVALENT CAPACITANCE

(75) Inventor: Shabbir H. Batterywala, Bangalore (IN)

(73) Assignee: Synopsys, Inc., Mountain View, CA (US)

( * ) Notice: Subject to any disclaimer, the term of this patent is extended or adjusted under 35 U.S.C. 154(b) by 189 days.

(21) Appl. No.: 11/077,239

(22) Filed: Mar. 9, 2005

(65) Prior Publication Data

US 2006/0206841 A1   Sep. 14, 2006

(51) Int. Cl.
*G06F 17/50* (2006.01)
(52) U.S. Cl. ............................ 716/4; 716/5
(58) Field of Classification Search ........ 716/1–2, 716/4–5, 10; 703/13–14
See application file for complete search history.

(56) References Cited

U.S. PATENT DOCUMENTS 6,826,517 B2 * 11/2004 Okada ........................ 716/4
7,124,069 B2 * 10/2006 Meuris et al. .............. 716/1
2006/0053394 A1 * 3/2006 Batterywala et al. ........ 716/5

* cited by examiner

*Primary Examiner*—Paul Dinh
(74) *Attorney, Agent, or Firm*—Park, Vaughan & Fleming LLP

(57) ABSTRACT

One embodiment of the present invention provides a system that estimates the equivalent capacitances for a set of conductors within an electrical structure. During operation, the system constructs a Gaussian surface that encloses a first conductor, but does not contain any other conductor. The system then computes the equivalent capacitance by constructing a sequence of locations within the electric structure, wherein the first location in the sequence is on the Gaussian surface, and the last location in the sequence is on a second conductor in the set of conductors. Specifically, if a location in the sequence of locations is on the surface of a neighboring conductor that is not in the set of conductors, the system can select the next location in the sequence of locations on a neighboring Gaussian surface that encloses the neighboring conductor, but does not contain any other conductor. Note that, by selecting the next location in the sequence of locations on a neighboring Gaussian surface, the system can quickly reach the second conductor, thereby quickly estimating the equivalent capacitance by reducing the computational time required to construct the sequence of locations.

21 Claims, 3 Drawing Sheets

METHOD AND APPARATUS FOR COMPUTING EQUIVALENT CAPACITANCE

BACKGROUND

1. Field of the Invention

The present invention relates to the process of computing (or estimating) capacitance in an electrical structure. More specifically, the present invention relates to the process of estimating equivalent capacitance using statistical techniques.

2. Related Art

Rapid advances in computing technology have made it possible to perform trillions of computational operations each second on data sets that are sometimes as large as trillions of bytes. These advances can be largely attributed to the incredible-miniaturization of integrated circuits. Today, integrated circuits are being built at deep sub-micron (DSM) dimensions. At these dimensions, accurate extraction (or computation) of equivalent capacitances between signal (or interconnect) nets has become absolutely critical for performing any subsequent timing or signal integrity analyses.

Present capacitance extraction techniques include Finite Element Method (FEM), Boundary Element Method (BEM), and methods based on Monte Carlo Integration.

Note that modern fabrication technologies can have more than 10 routing layers that have non-uniform metal densities. This can result in large variations in the wafer topography which can cause severe manufacturing problems. Hence, Chemical-Mechanical Polishing (CMP) is typically used to reduce topography variation of these layers. Unfortunately, non-uniform metal densities can result in "dishing" during CMP, which can lead to severe manufacturing problems. Hence, to improve manufacturability, foundries often use fill nets (also known as dummy fills or fill metals) in low density regions to make the metal densities more uniform.

FIG. 1 illustrates a portion of an integrated circuit in which fill nets 102 are situated between two signal nets, 104 and 106, in accordance with an embodiment of the present invention. (Note that the dielectric material between these nets has not been illustrated in FIG. 1 for the sake of clarity.)

Note that for timing and signal integrity analyses, circuit designers are usually interested in the equivalent capacitance between signal nets, such as equivalent capacitance 108, which accounts for the presence of floating fill nets. On the other hand, the direct (or coupling) capacitance between a signal net and a floating fill net (or between two fill nets), such as direct (or coupling) capacitance 110, is typically not useful for timing and signal integrity analyses. Moreover, since floating fill nets can substantially increase the equivalent capacitance between signal nets, their effect on the equivalent capacitance cannot be ignored.

Unfortunately, modern integrated circuits often have a large number of floating fill nets in the proximity of a signal net. This can cause present techniques for computing equivalent capacitance to be computationally infeasible.

Hence, what is needed is a method and an apparatus to quickly and accurately estimate the equivalent capacitances for a set of signal nets in the presence of fill nets.

SUMMARY

One embodiment of the present invention provides a system that estimates the equivalent capacitances for a set of conductors within an electrical structure. During operation, the system constructs a Gaussian surface that encloses a first conductor (or net), but does not contain any other conductor.

Note that the system can estimate the equivalent capacitance by estimating the electric field at one or more locations on the Gaussian surface. The system then constructs a sequence of locations within the electric structure, wherein the first location in the sequence is on the Gaussian surface, and the last location in the sequence is on a second conductor in the set of conductors. Note that the electric potential at a location in the sequence can be used to estimate the electric field or electric potential at the previous location in the sequence. Specifically, the electric potential of the second conductor can be set to a nominal voltage, and the electric field at the first location can be estimated by working backwards from the last location to the first location. Furthermore, if a location in the sequence of locations is on the surface of a neighboring conductor that is not in the set of conductors, the system can select the next location in the sequence of locations on a neighboring Gaussian surface that encloses the neighboring conductor, but does not contain any other conductor. This allows the system to quickly reach the second conductor, thereby quickly estimating the equivalent capacitance by reducing the computational time required to construct the sequence of locations.

In a variation on this embodiment, the system selects the next location on the neighboring Gaussian surface using a probability distribution function which is proportional to the average permittivity of the dielectric material between the neighboring Gaussian surface and the neighboring conductor and which is inversely proportional to the distance between the neighboring Gaussian surface and the neighboring conductor.

In a variation on this embodiment, the system constructs the sequence of locations by, selecting the first location on the Gaussian surface using a first probability distribution function; constructing a second closed surface (e.g., a cube) that encloses the first location, wherein the second closed surface can touch a conductor, but cannot contain a conductor; selecting a second location on the second closed surface using a second probability distribution function; constructing a third closed surface (e.g., a cube) that encloses the second location, wherein the third closed surface can touch a conductor, but cannot contain a conductor; and selecting a third location on the third closed surface using a third probability distribution function.

In a further variation on this embodiment, the first probability distribution function approximates the behavior of the dot product of a normal vector and an electric field over the Gaussian surface; the second probability distribution function is proportional to the dot product of a normal vector and an electric-field Green's function that corresponds to the dielectric composition of the space enclosed within the second closed surface; and the third probability distribution function is proportional to the value of an electric-potential Green's function that corresponds to the dielectric composition of the space enclosed within the third closed surface.

In a further variation on this embodiment, the second closed surface is the largest possible cube centered at the first location with the following properties: the cube can touch a conductor, but cannot contain a conductor; and the dielectric composition of the cube corresponds to a dielectric configuration for which an electric-field Green's function is available in a pre-computed set of Green's functions.

In a further variation on this embodiment, the third closed surface is the largest possible cube centered at the second location with the following properties: the cube can touch a conductor, but cannot contain a conductor; and the dielectric composition of the cube corresponds to a dielectric configuration for which an electric-potential Green's function is available in a pre-computed set of Green's functions.

DETAILED DESCRIPTION

Floating Fill Nets

Figure 1:
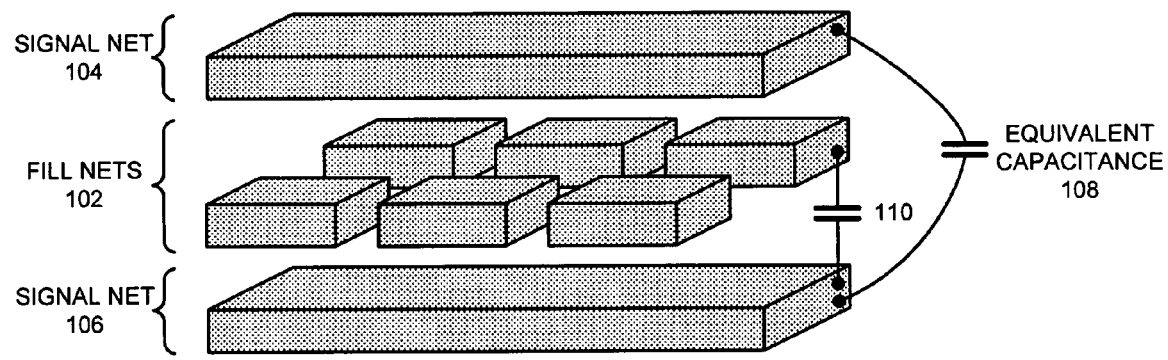
FIG. 1 illustrates a portion of an integrated circuit in which multiple fill nets are situated between two signal nets in accordance with an embodiment of the present invention.
Figure 2:
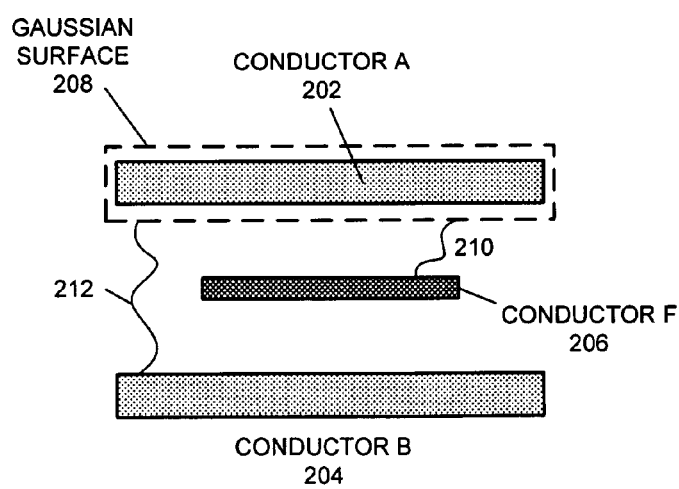
FIG. 2 illustrates how a floating fill net can affect the equivalent capacitance between two signal nets in accordance with an embodiment of the present invention.
Figure 2:
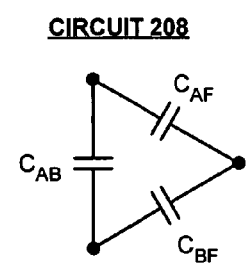

FIG. 2 illustrates how a floating fill net can affect the equivalent capacitance between two signal nets in accordance with an embodiment of the present invention. Conductors 202 and 204 are two different signal nets. Conductor 206 is a floating fill net that is situated between the two signal nets. The equivalent capacitance between conductors 202 and 204 can be computed using circuit 208. Capacitances $C_{AB}$, $C_{AF}$, and $C_{BF}$ are the direct (or coupling) capacitances between conductors 202 and 204, conductors 202 and 206, and conductors 204 and 206, respectively. Hence, the equivalent capacitance, C, can be calculated using the following equation:

$$C = C_{AB} + (C_{AF} \times C_{BF})/(C_{AF} + C_{BF}).$$

(The second term, $(C_{AF} \times C_{BF})/(C_{AF}+C_{BF})$, captures the increase in the equivalent capacitance due to conductor 206, which is part of the floating fill net.)

Note that, if conductor 206 is grounded, the equivalent capacitance, C, is equal to the direct (or coupling) capacitance, $C_{AB}$. But, for conductors 202 and 204, the capacitances to ground would increase. Hence, as far as timing and signal integrity issues are concerned, grounded fill nets do not have any advantages over floating fill nets. In fact, grounded fill nets have a drawback because they require significant additional routing resources to connect the fill structures to nearby ground lines. That is why designers typically prefer floating fill nets.

Furthermore, various fill metal shapes and placement strategies can be used to minimize the increase in capacitance due to floating fill nets. For example, plus-shaped fill patterns can be used to reduce the impact of floating fill nets. However, using a different fill metal shape does not eliminate the need to compute (or estimate) accurate equivalent capacitances.

Hence, accurate computation of equivalent capacitances between signal nets in the presence of floating fill nets is absolutely critical for performing any subsequent timing or signal integrity analyses.

Present capacitance extraction techniques include Finite Element Method (FEM), Boundary Element Method (BEM), and methods based on Monte Carlo Integration. Note that Monte Carlo Integration based techniques are often preferred because they are usually more accurate and scalable. (Furthermore, Monte Carlo Integration based techniques can also be naturally parallelized, which is another advantage of this approach.)

A Monte Carlo Integration based technique typically starts by constructing a Gaussian surface around a conductor, such as Gaussian surface 208. Next, the system initiates a random walk from a point on the Gaussian surface and terminates it when it reaches a conductor's surface. (Note that we define a random walk as a sequence of discrete steps of fixed or varying length. Furthermore, note that a random walk can also be viewed as a sequence of points or locations.)

For example, random walk 210 starts from a point on Gaussian surface 208 and terminates on conductor 206, while random walk 212 starts from another point on Gaussian surface 208 and terminates on conductor 204.

Note that, creating a random walk in a Monte Carlo based capacitance extraction technique involves constructing a sequence of closed surfaces, wherein each closed surface completely encloses a location but does not enclose any conductor. Consequently, it is impossible to construct a closed surface around a location on the surface of a conductor without enclosing at least a portion of the conductor. That is why present Monte Carlo Integration based techniques usually terminate a random walk once the random walk reaches the surface of a conductor.

The system then uses a number of these random walks to estimate the direct (or coupling) capacitances. For example, random walks 210 and 212 can be used to estimate direct (or coupling) capacitances $C_{AF}$ and $C_{AB}$, respectively.

Specifically, the system can estimate the direct capacitances using the following electrostatic equations:

$$Q = -\int_\Gamma \epsilon_p \hat{E}(p) \cdot \hat{\eta}(p) \, d\Gamma$$

$$\hat{E}(p) = \int_A \hat{G}_p(p_1) \phi(p_1) \, dA$$

$$\phi(p_1) = \int_{A_1} G_{p_1}(p_2) \phi(p_2) \, dA_1$$

where, $\Gamma$ is a Gaussian surface, Q is the total charge on all conductors within the Gaussian surface $\Gamma$, p is a point on $\Gamma$, $d\Gamma$ is an elemental area on $\Gamma$ around p, $\epsilon_p$ is the dielectric permittivity at p, $\hat{E}(\cdot)$ is the electric field, $\hat{\eta}(\cdot)$ is the unit normal vector, A is a conductor-free closed surface containing p, $p_1$ is a point on A, dA is an elemental area on A around $p_1$, $\hat{G}_p(\cdot)$ is an electric-field Green's function that corresponds to the dielectric composition of the space enclosed within closed surface A, $\phi(\cdot)$ is the electric potential, $A_1$ is a conductor-free closed surface containing $p_1$, $p_2$ is a point on $A_1$, $dA_1$ is an elemental area on $A_1$ around $p_2$, and $G_{p_1}(\cdot)$ is an electric-potential Green's function that corresponds to the dielectric composition of the space enclosed within closed surface $A_1$. (For notational simplicity, we use the integral symbol, $\int$, to denote a surface integral.)

Once all the coupling capacitances are known, the system can compute the equivalent capacitance. Specifically, the system can compute the equivalent capacitance using network reduction techniques. Unfortunately, since there can be thousands of fill nets, it can be computationally infeasible to compute the equivalent capacitances by first computing all the coupling capacitances.

Note that BEM-based methods can compute the equivalent capacitance by modifying BEM to solve Laplace's equation directly on the surface of the floating metal. Unfortunately, techniques based on BEM tend to generate large linear systems, and hence can require substantial computational resources.

Estimating Equivalent Capacitance in the Presence of Floating Fill Nets

Figure 3:
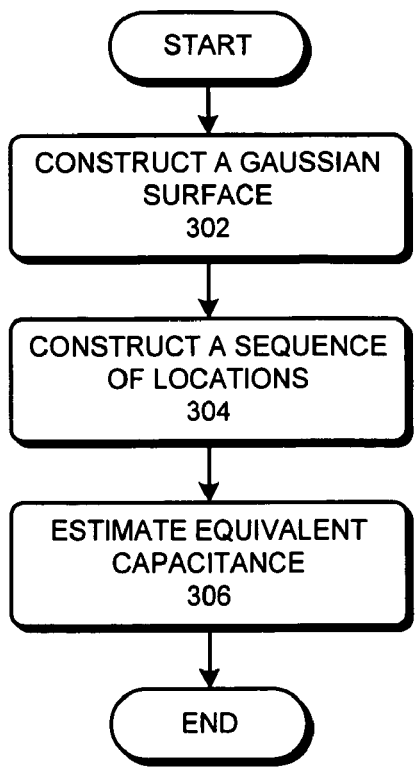
FIG. 3 presents a flowchart that illustrates the process of estimating an equivalent capacitance between a first conductor and a second conductor of a set of conductors within an electrical structure in accordance with an embodiment of the present invention.

FIG. 3 presents a flowchart that illustrates the process of estimating an equivalent capacitance between a first conductor and a second conductor of a set of conductors within an electrical structure in accordance with an embodiment of the present invention.

The process starts by constructing a Gaussian surface (which can be an arbitrary closed surface) that encloses the first conductor, but does not contain any other conductor (step 302). Note that the equivalent capacitance can be estimated by estimating or computing the electric field at a number of locations on the Gaussian surface.

Next, the system constructs a sequence of locations within the electric structure (step 304). (Note that a sequence of locations can be viewed as a random walk.)

Note that the electric potential at a location in the sequence can be used to estimate the electric field or electric potential at the previous location in the sequence. Furthermore, the sequence of locations is constructed so that the first location is on the Gaussian surface, and the last location in the sequence is on the second conductor. Moreover, the electric potential of the second conductor is set to a nominal voltage, thereby allowing the electric field at the first location to be estimated by working backwards from the last location to the first location.

The system then uses the sequence of locations to estimate the equivalent capacitance (step 306).

One embodiment of the present invention directly computes (or estimates) the equivalent capacitances for a given set of conductors (e.g., signal nets) without computing the coupling capacitances for neighboring conductors (e.g., fill nets) that are not in the set of conductors. Note that, since this embodiment does not compute (or estimate) all the coupling capacitances, it can substantially reduce the amount of computation required to compute (or estimate) the equivalent capacitances. Moreover, since this embodiment uses a Monte Carlo Integration based technique to estimate the equivalent capacitance, it does not suffer from scalability problems that are inherent to FEM and BEM based techniques.

Figure 4:
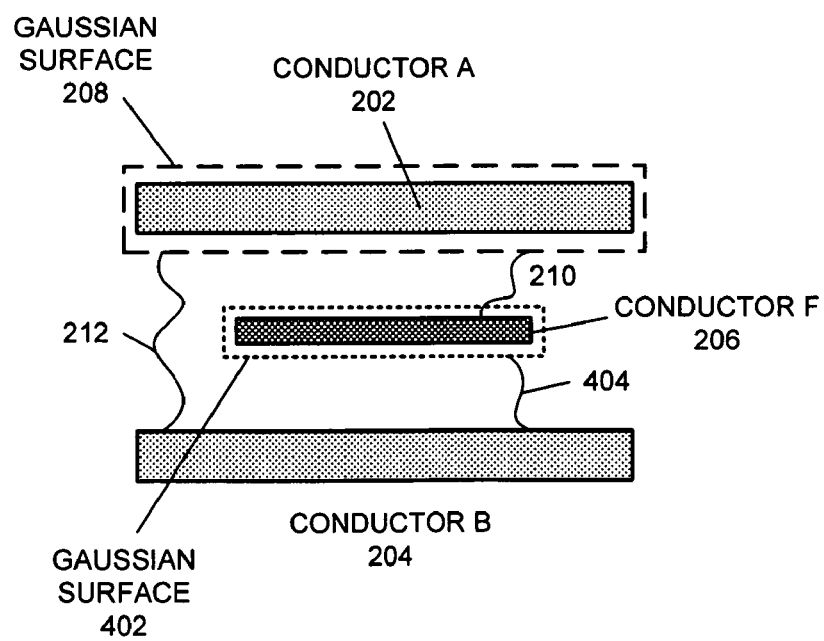
FIG. 4 illustrates how the present invention can directly compute the equivalent capacitance without computing all the coupling capacitances for neighboring conductors in accordance with an embodiment of the present invention.

FIG. 4 illustrates how the present invention can directly compute the equivalent capacitance without computing all the coupling capacitances for neighboring conductors in accordance with an embodiment of the present invention.

Recall that, in Monte Carlo Integration based techniques, a random walk usually terminates when it reaches a conductor's (or fill net's) surface. This is because it is impossible to construct a closed surface that encloses a point on the surface of a conductor without enclosing at least a portion of the conductor.

However, note that, since a fill net is a conductor, its surface can be viewed as an equi-potential surface. This insight can be used to create another electric-potential Green's function which can be used for continuing the random walk instead of terminating it when it reaches the surface of a conductor.

Specifically, when random walk 210 hits a neighboring conductor, such as conductor 206, the system can create Gaussian surface 402 that encloses the neighboring conductor. Next, the system can continue the random walk from a point on Gaussian surface 402. For example, random walk 404 is a continuation of random walk 210. Note that the random walk terminates when it reaches a conductor that is in the set of conductors for which the system is computing equivalent capacitances.

Figure 5:
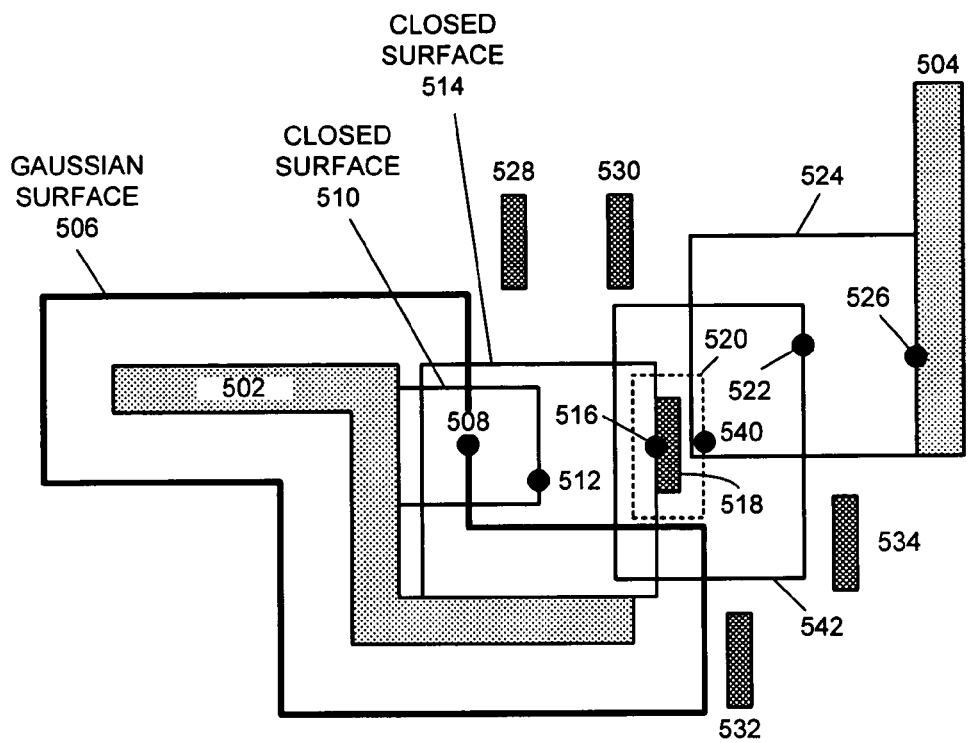
FIG. 5 illustrates the process of constructing a sequence of locations (which can be viewed as a random walk) within the electric structure to estimate the equivalent capacitance for a set of conductors in accordance with an embodiment of the present invention.

FIG. 5 illustrates the process of constructing a sequence of locations (which can be viewed as a random walk) within the electric structure to estimate the equivalent capacitance for a set of conductors in accordance with an embodiment of the present invention. (Note that, although constructing a sequence of locations is a three-dimensional process, for the sake of clarity and ease of discourse, we will use two dimensional figures while explaining the process.)

The set of conductors (or signal nets) for which equivalent capacitance are to be computed include conductors 502 and 504. Conductors 518, 528, 530, 532, and 534 are neighboring conductors (or fill nets).

The system starts by constructing a Gaussian surface, such as Gaussian surface 506, around a conductor, such as conductor 502. Note that the electric field at location 508 on Gaussian surface 506 can be used to estimate the charge on conductor 502, which can then be used to compute (or estimate) the equivalent capacitance.

Specifically, the following electrostatic equation can be used to compute the charge, Q, on conductor 502:

$$Q = -\int_\Gamma \epsilon_p \hat{E}(p) \cdot \hat{\eta}(p) d\Gamma$$

where, $\Gamma$ is a Gaussian surface, Q is the total charge on all conductors within the Gaussian surface $\Gamma$, p is a point on $\Gamma$, $d\Gamma$ is an elemental area on $\Gamma$ around p, $\epsilon_p$ is the dielectric permittivity at p, $\hat{E}(\cdot)$ is the electric field, and $\hat{\eta}(\cdot)$ is the unit normal vector.

In one embodiment of the present invention, the equivalent capacitance can be estimated by sampling the electric field at a number of locations on Gaussian surface 506. Specifically, the sampling locations are chosen using a probability distribution function that approximates the behavior of the dot product of the normal vector and the electric field over Gaussian surface 506.

Note that, if the system is unable to determine the electric field at location 508, it can construct a closed surface 510 around location 508. Specifically, the system constructs a closed surface, such as closed surface 510, so that it does not contain a conductor, such as conductor 504, but it can touch a conductor, such as conductor 502. Furthermore, in one embodiment of the present invention, closed surface 510 is constructed so that its dielectric composition corresponds to a dielectric configuration for which an electric-field Green's function is available in the pre-computed set of Green's functions. Additionally, in one embodiment of the present invention, the constructed closed surface 510 is a maximal cube, which is defined as the largest cube that has the following properties: (a) the cube can touch a conductor, but it cannot contain a conductor, and (b) the cube's dielectric composition corresponds to a dielectric configuration for which an electric-field Green's function is available in the pre-computed set of Green's functions. Moreover, in one embodiment of the present invention, the location 508 is at the center of the maximal cube.

Next, a location 512 is selected on the closed surface 510. Note that, we can estimate the electric field at location 508 if we can compute (or estimate) the electric potential at a location, such as location 512. Specifically, the electric field, Ê, at location 508 can be estimated using the following electrostatic equation:

$$\hat{E}(p) = \int_A \hat{G}_p(p_1)\phi(p_1) dA$$

where, $\hat{E}(\cdot)$ is the electric field, A is a conductor-free Gaussian surface containing location p, $p_1$ is a point on A, dA is an elemental area on A around $p_1$, $\phi(\cdot)$ is the electric potential, and $\hat{G}_p(\cdot)$ is an electric-field Green's function that corresponds to the dielectric composition of the space enclosed within closed surface A.

In one embodiment of the present invention, location 512 on the closed surface 510 is chosen using a probability distribution function that is proportional to the dot product of a normal vector and an electric-field Green's function that corresponds to the dielectric composition of the space enclosed within Gaussian surface 510.

If the system is unable to determine the electric potential at location 512, then it selects the next location in the sequence of locations. For example, the system can construct closed surface 514 around location 512. Next, the system can select location 516 on closed surface 514.

Figure 6:
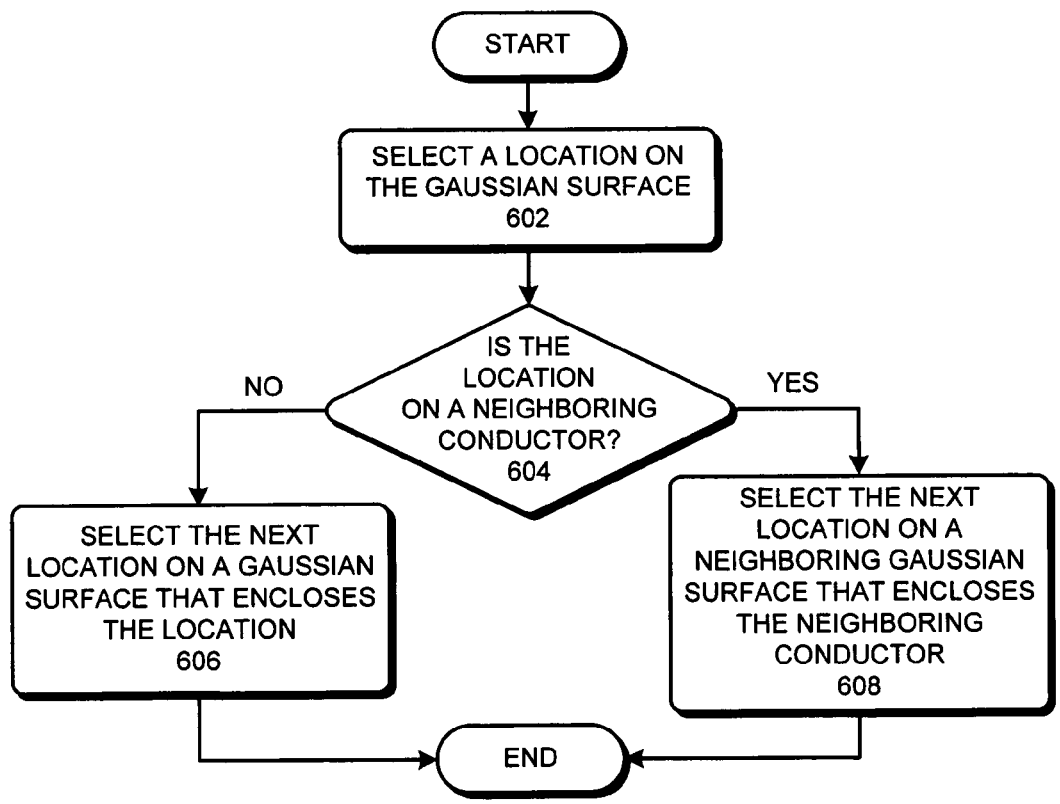
FIG. 6 presents a flowchart that illustrates how the system selects the next location in the sequence of locations in accordance with an embodiment of the present invention.

FIG. 6 presents a flowchart that illustrates how the system selects the next location in the sequence of locations in accordance with an embodiment of the present invention.

The process starts when the system selects a location, such as location 516, on a closed surface, such as closed surface 514 (step 602).

Next, the system checks whether location 516 is on a neighboring conductor, such as neighboring conductor 518, that is not in the set of conductors for which we want to calculate the equivalent capacitance (step 604).

If the location is not on the surface of a neighboring conductor, the system selects the next location on a closed surface that encloses the location (step 606). (Note that the process stops if the location is on the surface of a conductor that is in the set of conductors.)

Specifically, if the location is not on the surface of a neighboring conductor, the electric potential, $\phi$, can be estimated using the following electrostatic equation:

$$\phi(p_1) = \int_{A_1} G_{p_1}(p_2)\phi(p_2) dA_1$$

where, $A_1$ is a conductor-free closed surface containing location $p_1$, $p_2$ is a point on $A_1$, $dA_1$ is an elemental area on $A_1$ around $p_2$, $\phi(\cdot)$ is the electric potential, and $G_{p_1}(\cdot)$ is an electric-potential Green's function that corresponds to the dielectric composition of the space enclosed within closed surface $A_1$.

On the other hand, if the location is on the surface of a neighboring conductor that is not in the set of conductors, the system selects the next location in the sequence of locations on a neighboring Gaussian surface that encloses the neighboring conductor, but does not contain any other conductor (step 608).

For example, since location 516 is on the surface of neighboring conductor 518, the system constructs Gaussian surface 520 that encloses neighboring conductor 518. The system then selects location 540 on neighboring Gaussian surface 520 as the next location in the sequence of locations.

Specifically, if the location is on the surface of a conductor, the electric potential, $\phi$, can be estimated using the following electrostatic equation:

$$\phi(F) = \frac{1}{K} \int_{\Gamma_f} \frac{\epsilon_p}{x_p} \phi(p) d\Gamma_f$$

where, F is the neighboring conductor (or fill net), $\phi(F)$ is the electric potential of F, $\Gamma_f$ is a neighboring Gaussian surface that encloses F, p is a point on $\Gamma_f$, $d\Gamma_f$ is an elemental area around p, $\epsilon_p$ is the average permittivity over a line from p to the nearest point on the surface of F, $x_p$ is the length of this line, and K is a normalization constant that can be computed using the following equation:

$$K = \int_{\Gamma_f} \frac{\epsilon_p}{x_p} d\Gamma_f.$$

This process—that of recursively constructing a closed surface or a Gaussian surface around a location and then randomly selecting a location on the constructed surface—is continued until the selected location is on the surface of a conductor that is in the set of conductors. For example, if we cannot determine the potential at location 540, closed surface 542 is constructed, and location 522 is selected on closed surface 542. Next, closed surface 524 is constructed around location 522. Next, location 526 is selected on closed surface 524. Note that, since location 526 is on the surface of conductor 504, the process for constructing a sequence of locations stops.

Note that using the neighboring Gaussian surface to select the next location allows the system to "snap-across" fill nets. This enables the system to substantially reduce the computational time required to construct the sequence of locations which starts at one signal net and terminates at another signal net.

The system then estimates the equivalent capacitance. Specifically, the system sets the potential of the last point (which is on a conductor or a signal net) to a nominal voltage. Next, the system estimates the electric field at the first location by working backwards from the last location. For example, the system can set the potential of conductor 504 (which is equal to the potential at location 526) to a nominal voltage. The system can then successively estimate the electric potentials at locations 522, 540, 516, and 512. Next, the electric potential at location 512 can be used to estimate the electric field at location 508, which can then be used to estimate the charge on conductor 502, which, in turn, can be used to estimate the equivalent capacitance between conductors 502 and 504.

CONCLUSION

The data structures and code described in the foregoing description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art.

For example, it will be apparent to one skilled in the art that a number of formulae can be used to estimate the electric potential or field. Likewise, it will also be apparent to one skilled in the art that a number of techniques can be readily used to generate a sequence of locations, which can be viewed as a 3-D random walk.

Furthermore, it will be apparent to one skilled in the art that, the present invention can be readily used to compute the equivalent capacitance for a set of conductors in any electrical structure. For example, the present invention can be used to compute the capacitance of electronic devices, CCD (Charge-Coupled Device) displays, A/D (Analog-to-Digital) circuits, etc.

Additionally, the above disclosure is not intended to limit the present invention. The scope of the present invention is defined by the appended claims.

What is claimed is:

1. A method for estimating an equivalent capacitance between a first conductor and a second conductor of a set of conductors within an electrical structure, the method comprising:
    constructing a Gaussian surface that encloses the first conductor, but does not contain any other conductor, wherein the equivalent capacitance can be estimated by estimating the electric field at a location on the Gaussian surface; and
    constructing a sequence of locations within the electric structure, wherein the electric potential at a location in the sequence can be used to estimate the electric field or electric potential at the previous location in the sequence;
    wherein the first location in the sequence is on the Gaussian surface, and the last location in the sequence is on the second conductor;
    wherein, if a location in the sequence of locations is on the surface of a neighboring conductor that is not in the set of conductors, the next location in the sequence of locations is selected on a neighboring Gaussian surface that encloses the neighboring conductor, but does not contain any other conductor;
    wherein using the neighboring Gaussian surface to select the next location allows the method to quickly reach the second conductor, thereby quickly estimating the equivalent capacitance by reducing the computational time required to construct the sequence of locations.

2. The method of claim 1, wherein the next location is selected on the neighboring Gaussian surface using a probability distribution function which is proportional to the average permittivity of the dielectric material between the neighboring Gaussian surface and the neighboring conductor and which is inversely proportional to the distance between the neighboring Gaussian surface and the neighboring conductor.

3. The method of claim 1, wherein the electric potential of the second conductor is set to a nominal voltage, thereby allowing the electric field at the first location to be estimated by working backwards from the last location to the first location.

4. The method of claim 1, wherein constructing the sequence of locations involves:
    selecting the first location on the Gaussian surface using a first probability distribution function;
    constructing a second closed surface that encloses the first location, wherein the second closed surface can touch a conductor, but cannot contain a conductor;
    selecting a second location on the second closed surface using a second probability distribution function;
    constructing a third closed surface that encloses the second location, wherein the second closed surface can touch a conductor, but cannot contain a conductor; and
    selecting a third location on the third closed surface using a third probability distribution function.

5. The method of claim 4,
    wherein the first probability distribution function approximates the behavior of the dot product of a normal vector and an electric field over the Gaussian surface;
    wherein the second probability distribution function is proportional to the dot product of a normal vector and an electric-field Green's function that corresponds to the dielectric composition of the space enclosed within the second closed surface; and
    wherein the third probability distribution function is proportional to the value of an electric-potential Green's function that corresponds to the dielectric composition of the space enclosed within the third closed surface.

6. The method of claim 4, wherein the second closed surface is the largest possible cube centered at the first location with the following properties:
    the cube can touch a conductor, but cannot contain a conductor; and
    the dielectric composition of the cube corresponds to a dielectric configuration for which an electric-field Green's function is available in a pre-computed set of Green's functions.

7. The method of claim 4, wherein the third closed surface is the largest possible cube centered at the second location with the following properties:
    the cube can touch a conductor, but cannot contain a conductor; and
    the dielectric composition of the cube corresponds to a dielectric configuration for which an electric-potential Green's function is available in a pre-computed set of Green's functions.

8. A computer-readable storage medium storing instructions that when executed by a computer cause the computer to perform a method for estimating an equivalent capacitance between a first conductor and a second conductor of a set of conductors within an electrical structure, the method comprising:
    constructing a Gaussian surface that encloses the first conductor, but does not contain any other conductor, wherein the equivalent capacitance can be estimated by estimating the electric field at a location on the Gaussian surface; and
    constructing a sequence of locations within the electric structure, wherein the electric potential at a location in the sequence can be used to estimate the electric field or electric potential at the previous location in the sequence;

wherein the first location in the sequence is on the Gaussian surface, and the last location in the sequence is on the second conductor;

wherein, if a location in the sequence of locations is on the surface of a neighboring conductor that is not in the set of conductors, the next location in the sequence of locations is selected on a neighboring Gaussian surface that encloses the neighboring conductor, but does not contain any other conductor;

wherein using the neighboring Gaussian surface to select the next location allows the method to quickly reach the second conductor, thereby quickly estimating the equivalent capacitance by reducing the computational time required to construct the sequence of locations.

9. The computer-readable storage medium of claim 8, wherein the next location is selected on the neighboring Gaussian surface using a probability distribution function which is proportional to the average permittivity of the dielectric material between the neighboring Gaussian surface and the neighboring conductor and which is inversely proportional to the distance between the neighboring Gaussian surface and the neighboring conductor.

10. The computer-readable storage medium of claim 8, wherein the electric potential of the second conductor is set to a nominal voltage, thereby allowing the electric field at the first location to be estimated by working backwards from the last location to the first location.

11. The computer-readable storage medium of claim 8, wherein constructing the sequence of locations involves:
  selecting the first location on the Gaussian surface using a first probability distribution function;
  constructing a second closed surface that encloses the first location, wherein the second closed surface can touch a conductor, but cannot contain a conductor;
  selecting a second location on the second closed surface using a second probability distribution function;
  constructing a third closed surface that encloses the second location, wherein the second closed surface can touch a conductor, but cannot contain a conductor; and
  selecting a third location on the third closed surface using a third probability distribution function.

12. The computer-readable storage medium of claim 11, wherein the first probability distribution function approximates the behavior of the dot product of a normal vector and an electric field over the Gaussian surface;
  wherein the second probability distribution function is proportional to the dot product of a normal vector and an electric-field Green's function that corresponds to the dielectric composition of the space enclosed within the second closed surface; and
  wherein the third probability distribution function is proportional to the value of an electric-potential Green's function that corresponds to the dielectric composition of the space enclosed within the third closed surface.

13. The computer-readable storage medium of claim 11, wherein the second closed surface is the largest possible cube centered at the first location with the following properties:
  the cube can touch a conductor, but cannot contain a conductor; and
  the dielectric composition of the cube corresponds to a dielectric configuration for which an electric-field Green's function is available in a pre-computed set of Green's functions.

14. The computer-readable storage medium of claim 11, wherein the third closed surface is the largest possible cube centered at the second location with the following properties:
  the cube can touch a conductor, but cannot contain a conductor; and
  the dielectric composition of the cube corresponds to a dielectric configuration for which an electric-potential Green's function is available in a pre-computed set of Green's functions.

15. An apparatus for estimating an equivalent capacitance between a first conductor and a second conductor of a set of conductors within an electrical structure, comprising:
  a surface-constructing mechanism configured to construct a Gaussian surface that encloses the first conductor, but does not contain any other conductor, wherein the equivalent capacitance can be estimated by estimating the electric field at a location on the Gaussian surface; and
  a sequence-constructing mechanism configured to construct a sequence of locations within the electric structure, wherein the electric potential at a location in the sequence can be used to estimate the electric field or electric potential at the previous location in the sequence;
  wherein the first location in the sequence is on the Gaussian surface, and the last location in the sequence is on the second conductor;
  wherein, if a location in the sequence of locations is on the surface of a neighboring conductor that is not in the set of conductors, the next location in the sequence of locations is selected on a neighboring Gaussian surface that encloses the neighboring conductor, but does not contain any other conductor;
  wherein using the neighboring Gaussian surface to select the next location allows the apparatus to quickly reach the second conductor, thereby quickly estimating the equivalent capacitance by reducing the computational time required to construct the sequence of locations.

16. The apparatus of claim 15, wherein the next location is selected on the neighboring Gaussian surface using a probability distribution function which is proportional to the average permittivity of the dielectric material between the neighboring Gaussian surface and the neighboring conductor and which is inversely proportional to the distance between the neighboring Gaussian surface and the neighboring conductor.

17. The apparatus of claim 15, wherein the electric potential of the second conductor is set to a nominal voltage, thereby allowing the electric field at the first location to be estimated by working backwards from the last location to the first location.

18. The apparatus of claim 15, wherein the sequence-constructing mechanism is configured to:
  select the first location on the Gaussian surface using a first probability distribution function;
  construct a second closed surface that encloses the first location, wherein the second closed surface can touch a conductor, but cannot contain a conductor;
  select a second location on the second closed surface using a second probability distribution function;
  construct a third closed surface that encloses the second location, wherein the second closed surface can touch a conductor, but cannot contain a conductor; and to
  select a third location on the third closed surface using a third probability distribution function.

19. The apparatus of claim 18,
wherein the first probability distribution function approximates the behavior of the dot product of a normal vector and an electric field over the Gaussian surface;
wherein the second probability distribution function is proportional to the dot product of a normal vector and an electric-field Green's function that corresponds to the dielectric composition of the space enclosed within the second closed surface; and
wherein the third probability distribution function is proportional to the value of an electric-potential Green's function that corresponds to the dielectric composition of the space enclosed within the third closed surface.

20. The apparatus of claim 18, wherein the second closed surface is the largest possible cube centered at the first location with the following properties:

the cube can touch a conductor, but cannot contain a conductor; and the dielectric composition of the cube corresponds to a dielectric configuration for which an electric-field Green's function is available in a pre-computed set of Green's functions.

21. The apparatus of claim 18, wherein the third closed surface is the largest possible cube centered at the second location with the following properties:

the cube can touch a conductor, but cannot contain a conductor; and the dielectric composition of the cube corresponds to a dielectric configuration for which an electric-potential Green's function is available in a pre-computed set of Green's functions.

* * * * *